US010579557B2

(12) United States Patent
Jayasena et al.

(10) Patent No.: US 10,579,557 B2
(45) Date of Patent: Mar. 3, 2020

(54) NEAR-MEMORY HARDENED COMPUTE BLOCKS FOR CONFIGURABLE COMPUTING SUBSTRATES

(71) Applicant: Advanced Micro Devices, Inc., Santa Clara, CA (US)

(72) Inventors: Nuwan Jayasena, Santa Clara, CA (US); Michael Ignatowski, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/872,943

(22) Filed: Jan. 16, 2018

(65) Prior Publication Data

US 2019/0220426 A1   Jul. 18, 2019

(51) Int. Cl.
*G06F 13/16* (2006.01)
*G06F 3/06* (2006.01)

(52) U.S. Cl.
CPC .......... *G06F 13/1694* (2013.01); *G06F 3/065* (2013.01); *G06F 3/068* (2013.01); *G06F 3/0631* (2013.01)

(58) Field of Classification Search
CPC ................................................ G06F 15/7867
See application file for complete search history.

(56) References Cited

U.S. PATENT DOCUMENTS

| | | | |
|---|---|---|---|
| 6,301,696 B1 * | 10/2001 | Lien | G06F 17/5045 257/E27.107 |
| 8,105,885 B1 * | 1/2012 | Lee | H01L 27/0207 257/E21.67 |
| 8,635,570 B1 * | 1/2014 | Orthner | G06F 15/7867 716/117 |
| 8,738,891 B1 | 5/2014 | Karandikar et al. | |
| 2005/0166038 A1 | 7/2005 | Wang et al. | |
| 2006/0031659 A1 | 2/2006 | Chow | |

(Continued)

OTHER PUBLICATIONS

Microsoft Research, "Project Catapult" Jun. 1, 2011, 4 pages, available at: https://www.microsoft.com/en-us/research/project/project-catapult/.

(Continued)

*Primary Examiner* — Henry Tsai
*Assistant Examiner* — Juanito Borromeo
(74) *Attorney, Agent, or Firm* — Volpe and Koenig, P.C.

(57) ABSTRACT

A configurable computing system which uses near-memory and in-memory hardened logic blocks is described herein. The hardened logic blocks are incorporated into memory modules. The memory modules include an interface or communication logic to communicate between the configurable computing substrate and the memory module. In an implementation, the memory modules can include an on-die memory or other forms of non-configurable logic to enable more efficient processing for a variety of operations. In another implementation, the memory modules can include a portion of configurable computing substrate logic fabric to enable more efficient processing for a variety of operations. In another implementation, the memory modules can include an on-die memory and a portion of configurable computing substrate logic fabric to enable more efficient processing for a variety of operations.

17 Claims, 4 Drawing Sheets

(56) References Cited

U.S. PATENT DOCUMENTS

2009/0055596 A1 2/2009 Wallach et al.
2012/0079177 A1 3/2012 Brewer et al.

OTHER PUBLICATIONS

Ouyang, J. et al, "XPU: A programmable FPGA Accelerator for diverse workloads" Hot Chips, Aug. 20-22, 2017, 22 pages, Cupertino, CA, USA.
Nicol, C., "A Dataflow Processing Chip for Training Deep Neural Networks", Hot Chips, Aug. 20-22, 2017, 25 pages, Cupertino, CA, USA.

* cited by examiner

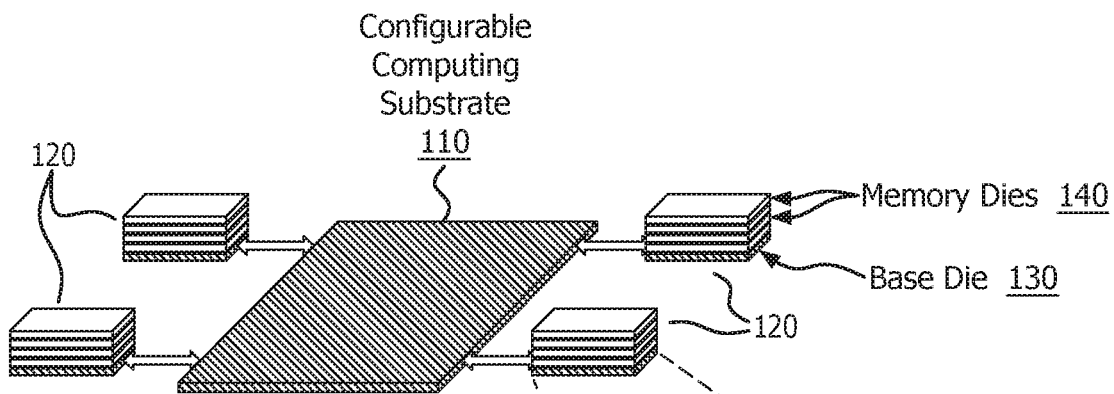
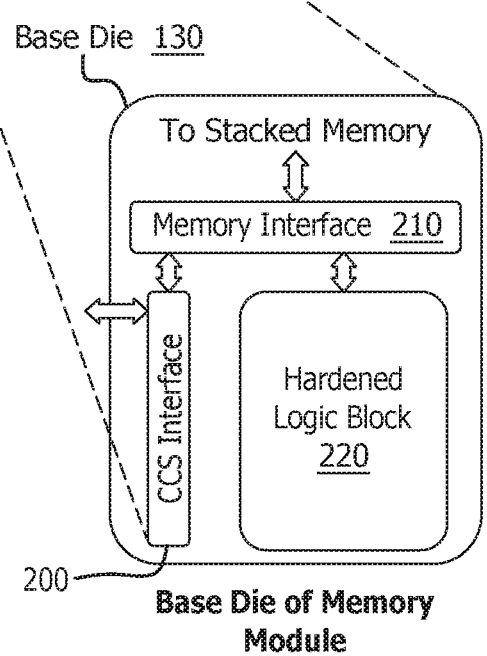
FIG. 1
FIG. 2

NEAR-MEMORY HARDENED COMPUTE BLOCKS FOR CONFIGURABLE COMPUTING SUBSTRATES

BACKGROUND

Configurable platforms are being deployed in data centers and are promising candidate architectures for accelerating certain classes of workloads. However, these configurable platforms typically only outperform graphics processing units (GPUs) and other types of compute-dense processing units for certain types of calculations (those with irregular data flows, computations on non-standard bit-width data types, etc.). In order to address this drawback, field-programmable gate array (FPGA) vendors have started incorporating hardened logic, hardcoded logic blocks, or hardened compute blocks (collectively "hardened logic blocks") for a number of compute element types including central processing units (CPUs), floating point (FP) units and the like in the FPGAs. However, this requires the FPGA vendors to produce a wide variety of devices with different mixes of hardcoded logic blocks for various market segments. Even with such hardcoded logic blocks, the efficiency of the configurable platform is sub-optimal for applications that have sections of code that can benefit from dense compute engines such as GPUs. A conventional technique incorporates multiple discrete devices of each kind in the system at a board level (e.g., a CPU and a GPU along with the FPGA). This technique increases system-level cost and complexity as multiple discrete devices need to be incorporated and coordinated. Another conventional technique incorporates hardened logic blocks on the FPGA device. This technique requires the manufacture of many different devices with varying mixes of hardened logic block types and still runs the risk of not being optimal for any particular workload.

BRIEF DESCRIPTION OF THE DRAWINGS

A more detailed understanding may be had from the following description, given by way of example in conjunction with the accompanying drawings wherein:

FIG. 1 is an example high level block diagram of a configurable computing substrate with near-memory hardened logic in accordance with some embodiments;

FIG. 2 is an example detailed block diagram of a base die integrated with a memory stack in accordance with some embodiments;

DETAILED DESCRIPTION

Figure 3:
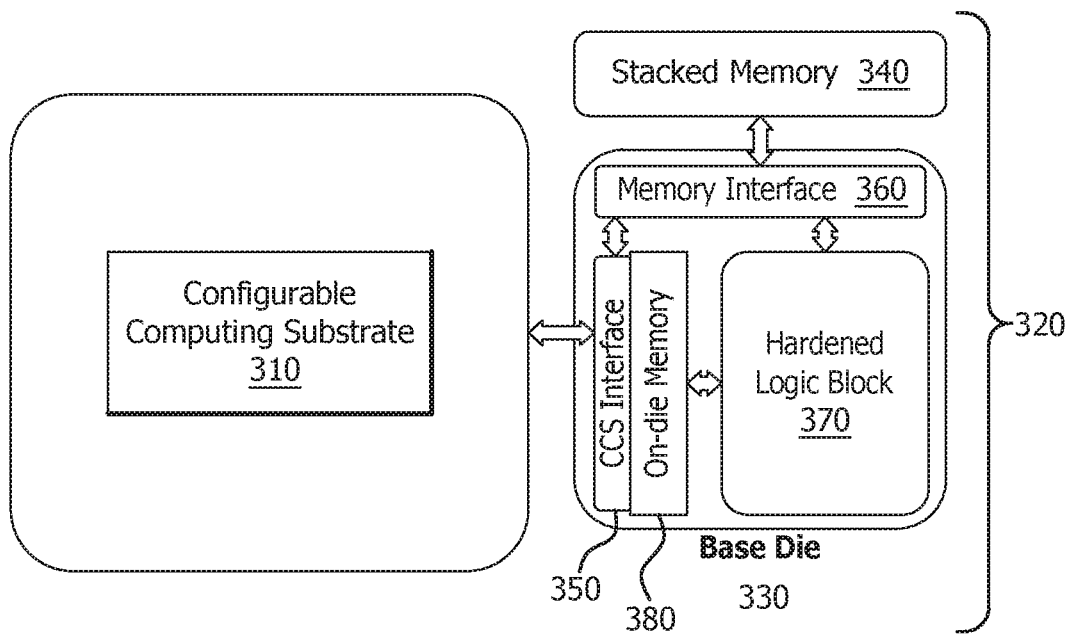
FIG. 3 is another example block diagram of a configurable computing substrate with near-memory hardened logic in accordance with some embodiments.

Configurable computing substrates or configurable logic devices (collectively "configurable computing substrates") have gained considerable attention recently for datacenter deployments and machine learning acceleration. Configurable computing substrates can refer to a field-programmable gate array (FPGA), complex programmable logic devices (CPLD), coarse-grain reconfigurable arrays (CGRA), gate arrays and other similar platforms or devices. However, such configurable computing substrates can be augmented with hardened logic blocks for efficient support of computations with dense arithmetic or complex control flows. That is, configurable computing substrates typically incorporate hardened logic blocks for functionality that cannot be efficiently implemented using configurable logic blocks.

Described herein is a configurable computing system which uses near-memory and in-memory hardened logic blocks to enhance the capabilities of configurable computing substrates without requiring additional discrete components to be added to the configurable computing substrates, such as an FPGA device. These hardened logic blocks can include but are not limited to, central processing units (CPUs), CPU cores, graphics processing units (GPUs), GPU cores, hardcoded accelerators, application specific integrated circuit (ASIC) blocks, execution engines, data-parallel floating-point-capable execution engines and other similar devices or logic and combinations thereof. The hardened logic blocks are incorporated into memory modules. In particular, the hardened logic blocks are on a base or logic die or a memory die of the memory module. In an implementation, a separate die can be added and included as part of the memory module for implementing the hardened logic blocks.

The memory modules include an interface or communication logic to communicate between the configurable computing substrate and the memory module. In an implementation, the interface between the configurable computing substrate and the memory modules can be proprietary on a condition that the interfaces are compatible to enable mix-and-match use. In an implementation, the interface may be a standard such as Joint Electron Device Engineering Council (JEDEC) high bandwidth memory (HBM) to enable the use of commodity memory modules. Standardization of the interface would enhance flexibility by allowing use of third party memory modules. In an implementation, the memory modules can include on-die memory such as static random access memory (SRAM) or other forms of non-configurable logic to enable more efficient processing for a variety of operations. In another implementation, the memory modules can include a portion of configurable computing substrate logic fabric to enable more efficient processing for a variety of operations. In another implementation, the memory modules can include SRAM and a portion of configurable computing substrate logic fabric to enable more efficient processing for a variety of operations.

Incorporation of the hardened logic blocks on the memory modules avoids the need to redesign the core configurable computing substrate for multiple market segments and allows a single configurable computing substrate to be targeted to many markets by simple varying the mix of base die types used in the memory modules.

Described herein are illustrative implementations for configuring the memory modules and for moving data back and forth between the configurable computing substrate and the hardened logic blocks in the memory modules. Further combinations are envisioned without departing from the scope of the specification and claims described herein.

FIG. 1 shows an example high level block diagram of a configurable platform 100 in accordance with certain implementations. The configurable platform 100 includes a configurable computing substrate 110 connected to or in communication with (collectively "connected to") memory module(s) 120. The memory module(s) 120 can be 3D-stacked memory modules which have a base or logic die 130 stacked with memory dies 140.

FIG. 2 shows an exploded view of the base die 130 of the memory module 120 of FIG. 1 in accordance with certain implementations. The base die 130 includes a configurable computing substrate interface 200 (shown as CCS Interface 200 in FIG. 2) for communicating with the configurable computing substrate 110. The configurable computing substrate interface 200 is connected to a memory interface 210, which in turn is connected to stacked memory, e.g. the memory dies 140. The memory interface 210 is further connected to hardened logic block 220. Consequently, the hardened logic block 220 is a near-memory or in-memory construct with respect to the configurable computing substrate 110. The hardened logic block 220 can include one or more logic blocks; for ease of description, only one logic block is referred to herein.

Operationally, the configurable computing substrate 110 writes data to the memory dies 140 via the configurable computing substrate interface 200 and the memory interface 210. The hardened logic block 220 reads the data from the memory dies 140 via the memory interface 210. The results from the hardened logic block 220 are written into the memory dies 140 via the memory interface 210. The configurable computing substrate 110 then reads the results from the memory dies 140 via the configurable computing substrate interface 200 and the memory interface 210. In an implementation, the configurable computing substrate 110 and the hardened logic block 220 can use memory store and load operations to write/read the data in/out of memory and operate on it or vice versa. The configurable computing substrate interface 200 between the configurable computing substrate 110 and the memory module 120 may be an industry-standard memory interface (as only loads/stores are needed from outside the memory module 120) or a proprietary one.

FIG. 3 shows an example high level block diagram of a configurable platform 300 in accordance with certain implementations. The configurable platform 300 includes a configurable computing substrate 310 connected to or in communication with (collectively "connected to") a memory module 320. The memory module 320 can be a 3D-stacked memory module which has a base die 330 connected to a stacked memory 340. The base die 330 includes a configurable computing substrate interface 350 (shown as CCS Interface 350 in FIG. 3) for communicating with the configurable computing substrate 310. The configurable computing substrate interface 350 is connected to a memory interface 360, which in turn is connected to the stacked memory 340. The memory interface 360 is further connected to a hardened logic block 370. The hardened logic block 370 can include one or more logic blocks; for ease of description, only one logic block is referred to herein. The configurable computing substrate interface 350 is further connected to an on-die memory 380 within the base die 330 which is included in the address space or range of the memory module 320. In a non-limiting example, the on-die memory 380 can be SRAM. The on-die memory 380 provides efficient processing of data when the data is sized compatibly with the capacity of the on-die memory 380 since reads and writes to the stacked memory 340 can be avoided. In an implementation, the on-die memory 380 can be provisioned on the configurable computing substrate 310. In this implementation, the configurable computing substrate interface 350 enables addressing of the on-die memory 380 from the hardened logic block 370 in the memory module 320.

Operationally, the configurable computing substrate 310 writes data via the configurable computing substrate interface 350. The amount of data to be communicated with the hardened logic block determines where the data is stored. If the amount of data is compatible with the capacity of the on-die memory 380, then the configurable computing substrate 310 writes the data to the on-die memory 380 (using the address space associated with the on-die memory 380) via the configurable computing substrate interface 350. If the amount of data is not compatible with the capacity of the on-die memory 380, then the configurable computing substrate 310 writes the data to the stacked memory 340 (using the address space associated with the stacked memory 340) via the configurable computing substrate interface 350 and the memory interface 360. The hardened logic block 370 reads the data from either the stacked memory 340 via the memory interface 360 or from the on-die memory 380. The results from the hardened logic block 220 are written into the stacked memory 340 via the memory interface 360 or in the on-die memory 380, depending on the amount of data associated with the results and using the appropriate address space. The configurable computing substrate 310 then reads the results from the stacked memory 340 via the configurable computing substrate interface 350 and the memory interface 360 or from the on-die memory 380 via the configurable computing substrate interface 350, using the appropriate address space. In some implementations, the on-die memory 380 may operate as a cache for the stacked memory 340, and may automatically capture a subset of the data being written to the stacked memory 340, and service subsequent reads to that data, thereby reducing accesses to the stacked memory 340.

Figure 4:
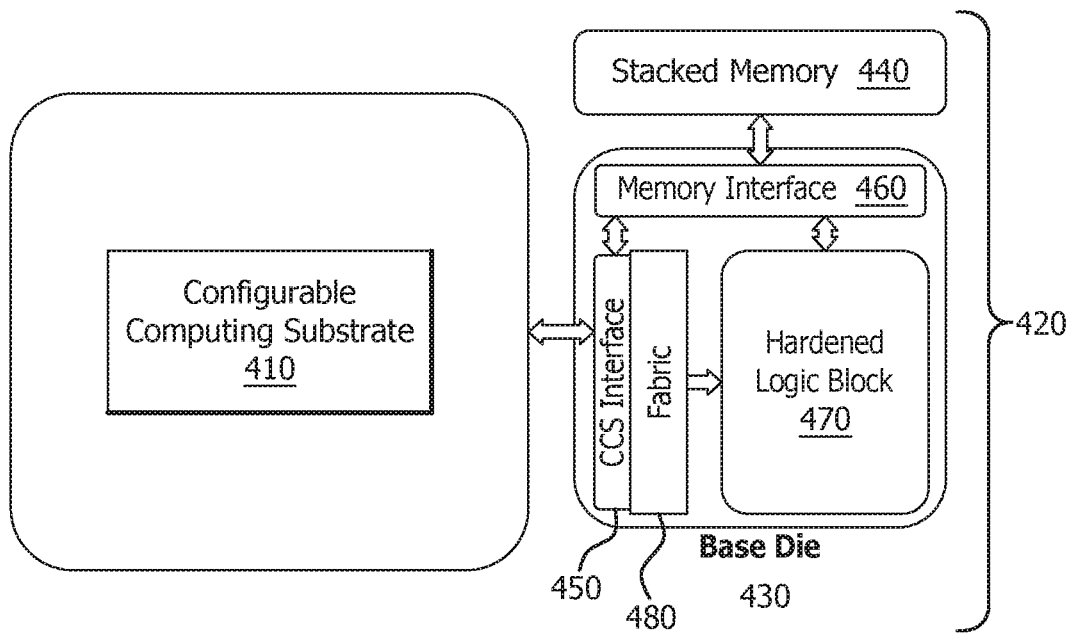
FIG. 4 is yet another example block diagram of a configurable computing substrate with near-memory hardened logic in accordance with some embodiments.

FIG. 4 shows an example high level block diagram of a configurable platform 400 in accordance with certain implementations. The configurable platform 400 includes a configurable computing substrate 410 connected to or in communication with (collectively "connected to") a memory module 420. The memory module 420 can be a 3D-stacked memory module which has a base die 430 connected to a stacked memory 440. The base die 430 includes a configurable computing substrate interface 450 (shown as CCS Interface 450 in FIG. 4) for communicating with the configurable computing substrate 410. The configurable computing substrate interface 450 is connected to a memory interface 460, which in turn is connected to the stacked memory 440. The memory interface 460 is further connected to hardened logic block 470. The hardened logic block 470 can include one or more logic blocks; for ease of description, only one logic block is referred to herein. The configurable computing substrate interface 450 is further connected to a configurable computing substrate fabric 480. The configurable computing substrate fabric 480 acts or appears as part of the configurable computing substrate 410 on the base die 430 and enables the hardened logic block 470 to use, for example, registers, and therefore avoid having to do loads and stores with respect to the stacked memory 440. This allows seamless communication between the configurable computing substrate 410 and memory module 420 by extending the configurable computing substrate's internal fabric over the interface between the two devices. In this implementation, the hardened logic block 470 in the memory module 420 can architecturally be interfaced with the rest of the configurable computing substrate 410 in any manner as if the hardened logic block 470 were directly on the configurable computing substrate 410 itself.

Operationally, the configurable computing substrate 410 communicates with the hardened logic block 470 via the configurable computing substrate interface 450. The nature or type of the computation determines how data is communicated from the configurable computing substrate 410 to the hardened logic block 470. In a non-limiting illustrative example, the nature of the computation can refer to streaming computations where the configurable computing substrate fabric 480 perform some step(s) of a computation and the hardened logic block 470 performs the next step(s) (or vice versa). In this instance, there is not a lot of data that is collected between the steps that happen on each device and data simply gets passed from one device to the other device as the data becomes available. Consequently, having configurable computing substrate fabric 480 right next to the hardened logic block 470 helps with the handoff in these types of computations.

If the computation is such that the configurable computing substrate fabric 480 on the memory module 420 can be used to interface with the hardened logic block 470, data is passed from the configurable computing substrate 410 to the hardened logic block 470 via the configurable computing substrate interface 450 and mediated by the configurable computing substrate fabric 480 on the memory module 420. If the nature of the computation is such that the configurable computing substrate fabric 480 on the memory module 420 cannot be used to interface with the hardened logic block 470, then the data is stored in the stacked memory 440 via the configurable computing substrate interface 450 and the memory interface 460. The hardened logic block 470 receives the data through the configurable computing substrate fabric 480 on the memory module 420 or accesses the data from the stacked memory 440 via the memory interface 460. The results from the hardened logic block 470 are written into the stacked memory 440 via the memory interface 460 or communicated to the configurable computing substrate 410 via the configurable computing substrate interface 450 and mediated by the configurable computing substrate fabric 480 on the memory module 420, depending on the nature of the computation. The configurable computing substrate 410 then reads the results from the stacked memory 440 via the configurable computing substrate interface 450 and the memory interface 460 or operates on them directly via the configurable computing substrate interface 450 and mediated by the configurable computing substrate fabric 480 on the memory module 420, as appropriate.

In an implementation, a configurable platform can include a configurable computing substrate connected to a memory module, where the memory module includes both an on-die memory as described in FIG. 3 and a configurable computing substrate fabric as described in FIG. 4. Such an implementation can consider both data size and the nature of the computation with additional logic to determine priority considerations between the data size and the nature of the computation determinations.

While described herein as being implemented on a base die of a memory module, the hardened logic block(s) can be implemented on a memory die or on a separate die connected to the memory module.

While described herein as being employed in a memory organization consisting of one logic die and one or more memory dies, there are other physical manifestations including for example multiple logic dies. Although described as a vertical stack of a logic die with one or more memory dies, another embodiment may place some or all of the logic on a separate chip horizontally on an interposer or packaged together in a multi-chip module (MCM). More than one logic die may be included in the overall stack or system.

While described herein as being implemented with respect to a configurable computing substrate, the near-memory hardened logic block architecture can be used with other platforms or devices without departing from the scope of the description or claims provided herein.

Figure 5:
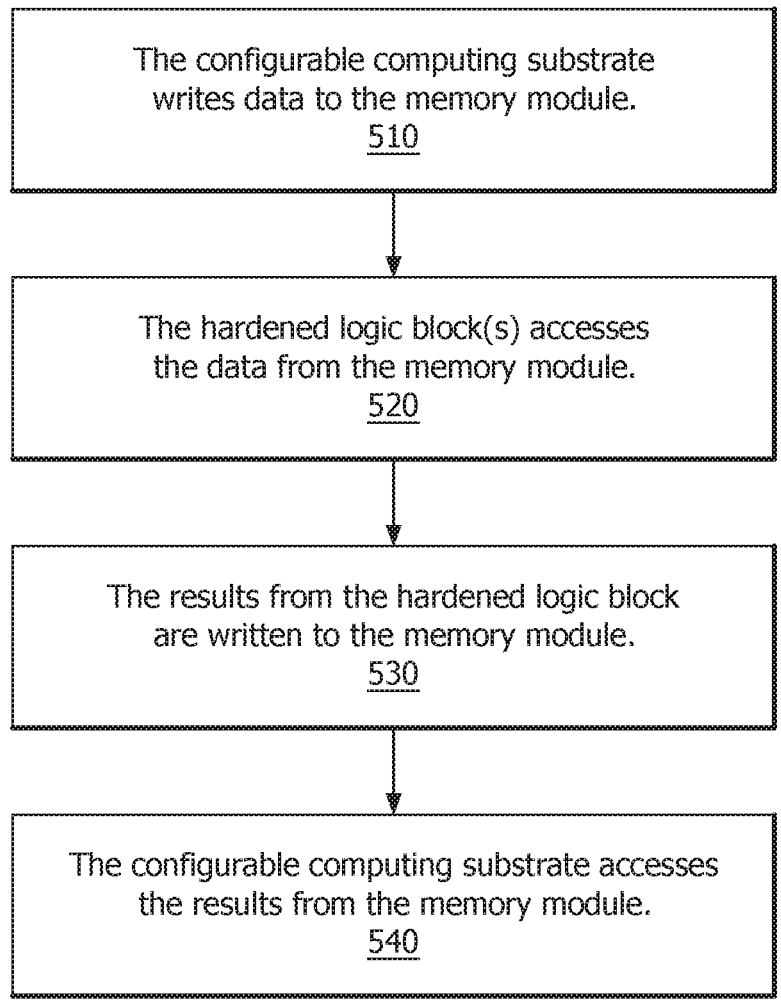
FIG. 5 is an example flowchart for using a configurable computing substrate with near-memory hardened logic in accordance with some embodiments.

FIG. 5 is an example high level flowchart 500 for data processing using a configurable platform which has a configurable computing substrate in communication with hardened logic block(s) implemented on memory module(s). The configurable computing substrate writes data to the memory module (step 510). In an implementation, the data is stored in a memory die or memory stack. In another implementation, the data is stored in an on-die memory associated with the hardened logic bock(s) when the data is compatible with the capacity of the on-die memory. In another implementation, the data is stored in logic or storage elements within an extension of the configurable logic fabric in the memory module. The hardened logic block(s) accesses the data from the memory module (step 520). In an implementation, the data is read from a memory die or memory stack. In another implementation, the data is read from an on-die memory associated with the hardened logic blocks when the data is compatible with the capacity of the on-die memory. In another implementation, the data is communicated from an extension of the configurable logic fabric in the memory module. The results from the hardened logic block are written to the memory module (step 530). In an implementation, the results are stored in a memory die or memory stack. In another implementation, the results are stored in an on-die memory associated with the hardened logic blocks when the size of the data associated with the results is compatible with the capacity of the on-die memory. In another implementation, the results are stored in logic or storage elements within an extension of the configurable logic fabric in the memory module. The configurable computing substrate accesses the results from the memory module (step 540). In an implementation, the results are read from a memory die or memory stack. In another implementation, the results are read from an on-die memory associated with the hardened logic block(s) when the size of the data associated with the results is compatible with the capacity of the on-die memory. In another implementation, the results are accessed from logic or storage elements within an extension of the configurable logic fabric in the memory module.

Figure 6:
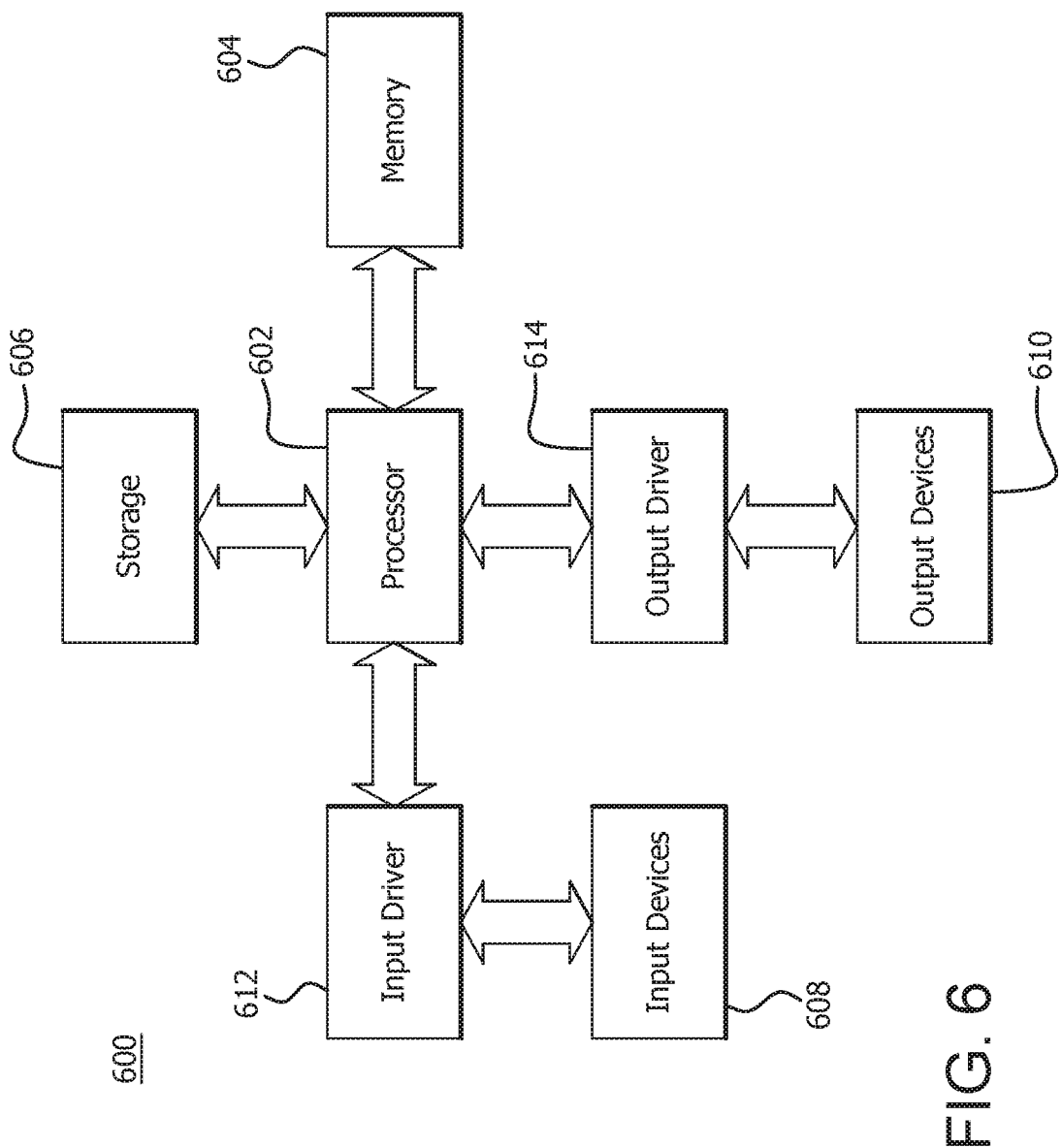
FIG. 6 is a block diagram of an example device in which one or more disclosed embodiments may be implemented.

FIG. 6 is a block diagram of an example device 600 in which one or more features of the disclosure can be implemented. The device 600 can include, for example, a computer, a gaming device, a handheld device, a set-top box, a television, a mobile phone, or a tablet computer. The device 600 includes a processor 602, a memory 604, a storage 606, one or more input devices 608, and one or more output devices 610. The device 600 can also optionally include an input driver 612 and an output driver 614. It is understood that the device 600 can include additional components not shown in FIG. 6.

In various alternatives, the processor 602 includes a central processing unit (CPU), a graphics processing unit (GPU), a CPU and GPU located on the same die, or one or more processor cores, wherein each processor core can be a CPU or a GPU. In various alternatives, the memory 604 can be located on the same die as the processor 602, or is located separately from the processor 602. The memory 604 includes a volatile or non-volatile memory, for example, random access memory (RAM), dynamic RAM, or a cache.

The storage 606 includes a fixed or removable storage, for example, a hard disk drive, a solid state drive, an optical disk, or a flash drive. The input devices 608 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 610 include, without limitation, a configurable computing substrate, a display, a speaker, a printer, a haptic feedback device, one or more lights, an antenna, or a network connection (e.g., a wireless local area network card for transmission and/or reception of wireless IEEE 802 signals).

The input driver 612 communicates with the processor 602 and the input devices 608, and permits the processor 602 to receive input from the input devices 608. The output driver 614 communicates with the processor 602 and the output devices 610, and permits the processor 602 to send output to the output devices 610. It is noted that the input driver 612 and the output driver 614 are optional components, and that the device 600 will operate in the same manner if the input driver 612 and the output driver 614 are not present.

In general, a configurable computing platform includes a configurable computing substrate and a memory module connected to the configurable computing substrate. The memory module including a memory die and another die. The another die including a hardened logic block configured to operate on data sent by the configurable computing substrate, a configurable computing substrate interface configured to communicate with the configurable computing substrate and a memory interface configured to communicate with the memory die, the configurable computing substrate interface, and the hardened logic block. In an implementation, the hardened logic block is at least one of: a central processing unit (CPU), a CPU core, a graphics processing unit (GPU), a GPU core, a hard-coded accelerator, an application specific integrated circuit block, an execution engine, and a data-parallel floating-point-capable execution engine. In an implementation, the another die further includes an on-die memory configured to communicate with the configurable computing substrate interface and the hardened logic block. In an implementation, the on-die memory is further configured to communicate with the memory interface and functions as a cache for the memory die. In an implementation, the on-die memory is included in the address range of the memory module. In an implementation, the data from the configurable computing substrate is written to the on-die memory when the size of the data is substantially matched with the capacity of the on-die memory. In an implementation, results from the hardened logic block are written to the on-die memory when a data size of the results is substantially matched with the capacity of the on-die memory. In an implementation, the die further includes a configurable computing substrate fabric configured to communicate with the configurable computing substrate interface and the hardened logic block. In an implementation, the configurable computing substrate sends the data to the hardened logic block via the configurable computing substrate fabric based on a type of computation. In an implementation, the die further includes an on-die memory configured to communicate with the configurable computing substrate interface and the hardened logic block and a configurable computing substrate fabric configured to communicate with the configurable computing substrate interface and the hardened logic block. In an implementation, the die is a logic die. In an implementation, the die is a memory die.

In general, a method for computing using a configurable computing platform includes connecting a configurable computing substrate with a memory module. The configurable computing substrate writes data to a memory die included in the memory module via a configurable computing substrate interface and a memory interface, the configurable computing substrate interface and the memory interface being provided on a die included in the memory module. Data from the memory die is accessed by a hardened logic block via the memory interface, the hardened logic block being provided on the die. In an implementation, results are written to the memory die by the hardened logic block via the memory interface. In an implementation, data is written to an on-die memory via the configurable computing substrate interface when the size of the data is substantially matched with a capacity of the on-die memory, the on-die memory being provided on the die. In an implementation, results are written to the on-die memory by the hardened logic block when a data size of the results is substantially matched with the capacity of the on-die memory. In an implementation, a portion of the data is written to the on-die memory when the data is being written to the memory die and subsequent reads are serviced to the portion of the data. In an implementation, the on-die memory is included in the address range of the memory module. In an implementation, the data between the configurable computing substrate and the hardened logic block is communicated via a configurable computing substrate fabric and the configurable computing substrate interface based on a type of computation, the configurable computing substrate fabric being provided on the die. In an implementation, the data is written to an on-die memory via the configurable computing substrate interface when the size of the data is substantially matched with the capacity of the on-die memory, the on-die memory being provided on the die. In an implementation, results are written to the memory die by the hardened logic block when a data size of the results is substantially matched with the capacity of the on-die memory.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein, to the extent applicable, may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A configurable computing platform, comprising:
a configurable computing substrate; and
a memory module connected to the configurable computing substrate, the memory module including a memory die and a base die,
wherein the base die includes:
an on-die memory that is communicatively coupled to the configurable computing substrate interface;
a configurable computing substrate interface that is communicatively coupled to the configurable computing substrate;
a memory interface that is communicatively coupled to the memory die and the configurable computing substrate interface; and
a hardened logic block that is communicatively coupled to the on-die memory and the memory interface;
wherein the hardened logic block is configured to:
generate a computation result based on data sent by the configurable computing substrate, and
selectively store the computation result in the memory die or the on-die memory based on an amount of data contained in the computation result.

2. The configurable computing platform of claim 1, wherein the hardened logic block is at least one of: a central processing unit (CPU), a CPU core, a graphics processing unit (GPU), a GPU core, a hard-coded accelerator, an application specific integrated circuit block, an execution engine, and a data-parallel floating-point-capable execution engine.

3. The configurable computing platform of claim 1, wherein the on-die memory is configured to communicate with the memory interface and functions as a cache for the memory die.

4. The configurable computing platform of claim 1, wherein the on-die memory is included in an address range of the memory module.

5. The configurable computing platform of claim 1, wherein the data from the configurable computing substrate is written to the on-die memory when a size of the data is matched with a capacity of the on-die memory.

6. The configurable computing platform of claim 1, wherein the computation result is written to the on-die memory when a data size of the computation result is matched with a capacity of the on-die memory.

7. The configurable computing platform of claim 1, the base die further comprising:
a configurable computing substrate fabric that is communicatively coupled to the configurable computing substrate interface and the hardened logic block.

8. The configurable computing platform of claim 7, wherein the configurable computing substrate sends the data to the hardened logic block via the configurable computing substrate fabric based on a type of computation.

9. The configurable computing platform of claim 1, wherein the base die is a logic die.

10. The configurable computing platform of claim 1, wherein the base die and the memory die are vertically stacked.

11. A method for computing using a configurable computing platform, the method comprising:
receiving, by a memory module, data from a configurable computing substrate, wherein the memory module includes a memory die and a base die;
accessing, by a hardened logic block of the base die, the data via a memory interface of the base die;
generating, by the hardened logic block, a computation result based on the data; and
selectively writing, by the hardened logic block, the computation result to the memory die or an on-die memory of the base die.

12. The method of claim 11, further comprising:
writing the data to the on-die memory when a size of the data is matched with a capacity of the on-die memory.

13. The method of claim 11,
wherein the computation result is written to the on-die memory when a data size of the computation result is matched with a capacity of the on-die memory.

14. The method of claim 12, further comprising:
writing a portion of the data to the on-die memory when the data is being written to the memory the; and
servicing subsequent reads to the portion of the data.

15. The method of claim 12, wherein the on-die memory is included in an address range of the memory module.

16. The method of claim 11, further comprising:
communicating the data between the configurable computing substrate and the hardened logic block via a configurable computing substrate fabric and the configurable computing substrate interface based on a type of computation, the configurable computing substrate fabric being provided on the die.

17. The method of claim 16, further comprising:
writing the data to the on-die memory via the configurable computing substrate interface when a size of the data is matched with a capacity of the on-die memory, the on-die memory being provided on the die.

* * * * *